US 6,729,995 B1

(12) United States Patent
Bayer

(10) Patent No.: US 6,729,995 B1
(45) Date of Patent: May 4, 2004

(54) MULTI-STEP GEARBOX

(75) Inventor: Thomas Bayer, Igergheim (DE)

(73) Assignee: Alpha Getriebebau GmbH, Igersheim (DE)

( * ) Notice: Subject to any disclaimer, the term of this patent is extended or adjusted under 35 U.S.C. 154(b) by 0 days.

(21) Appl. No.: 10/130,805

(22) PCT Filed: Nov. 28, 2000

(86) PCT No.: PCT/DE00/04258

§ 371 (c)(1),
(2), (4) Date: May 21, 2002

(87) PCT Pub. No.: WO01/40680

PCT Pub. Date: Jun. 7, 2001

(30) Foreign Application Priority Data

Dec. 4, 1999 (DE) .......................... 199 58 637

(51) Int. Cl.[7] .............................. F16H 57/08
(52) U.S. Cl. .................. 475/348; 475/331
(58) Field of Search .............. 475/11, 331, 339

(56) References Cited

U.S. PATENT DOCUMENTS

| 2,053,130 A | | 9/1936 | Cheyne | |
| 3,015,973 A | | 9/1962 | Doerries | |
| 4,183,266 A | * | 1/1980 | Osumi | 475/337 |
| 4,574,658 A | * | 3/1986 | Abbott et al. | 475/343 |
| 5,409,430 A | * | 4/1995 | Hashimoto et al. | 475/331 |
| 5,910,066 A | * | 6/1999 | Schulz et al. | 475/336 |
| 6,464,613 B1 | * | 10/2002 | Kolb et al. | 475/296 |
| 2001/0035012 A1 | * | 11/2001 | Smith | 60/435 |

FOREIGN PATENT DOCUMENTS

| DE | 19720255 | | 12/1998 | |
| GB | 939894 | | 10/1963 | |
| JP | 406207651 A | * | 7/1994 | 475/331 |

* cited by examiner

Primary Examiner—Roger Pang
(74) Attorney, Agent, or Firm—Collard & Roe, P.C.

(57) ABSTRACT

A multi-step gearbox has a gearbox housing (1) and a first gear wheel (5) non-rotationally linked with the input shaft (2), a fourth (10) and fifth gear wheel (12) with a mutual fixed connection, a respective second (6) and third gear-wheel (8) with a mutual fixed connection and one planetary wheel (15) each rotate about a common planetary axis (B), and an internal-geared wheel (16) is non-rotationally linked with the gearbox housing (1).

10 Claims, 3 Drawing Sheets

MULTI-STEP GEARBOX

CROSS REFERENCE TO RELATED APPLICATIONS

Figure 1:
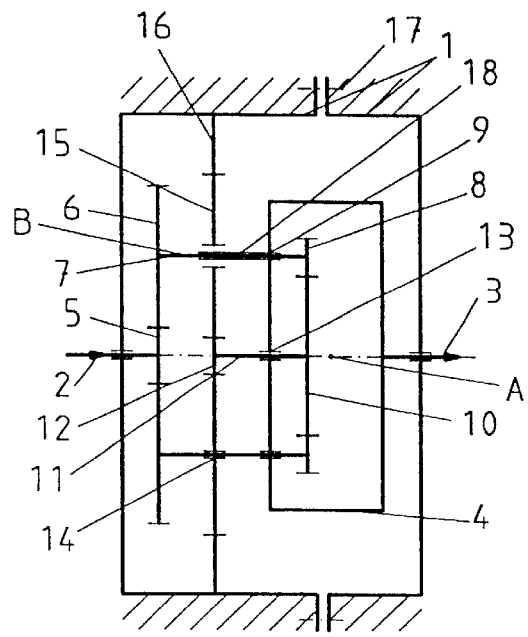

Applicant claims priority under 35 U.S.C. §119 of GERMAN Application No. 199 58 637.3 filed Dec. 4, 1999. Applicant also claims priority under 35 U.S.C. §120 of PCT/DE00/04258 filed on Nov. 28, 2000. The international application under PCT article 21(2) was not published in English.

This invention relates to a multistage toothed gearing which should have the following properties:

suitability for transmission of extremely high torques, high gearing ratio, small design, inexpensive fabrication.

A gearing having properties pointing in this direction, is especially a design which is compact in the axial direction.

In comparison with the gearing according to this invention, the gearing already known from U.S. patent application 2,053,130 does not have the following features:

the fourth and fifth gearwheels rotate with a mutual fixed connection about a common gear axis, at least one third gearwheel and the fourth gearwheel intermesh, the minimum of one planetary wheel and the hollow wheel in the direction of the common gearing axis are situated between the first gearwheel and the minimum of one second gearwheel on the one hand and the minimum of one third gearwheel and the fourth gearwheel on the other hand, to which end the connection between the second and third gearwheels passes through a planetary wheel assigned to these gearwheels in its planetary axis.

Expedient and advantageous embodiments of this invention are the object of the subclaims.

Figure 2:
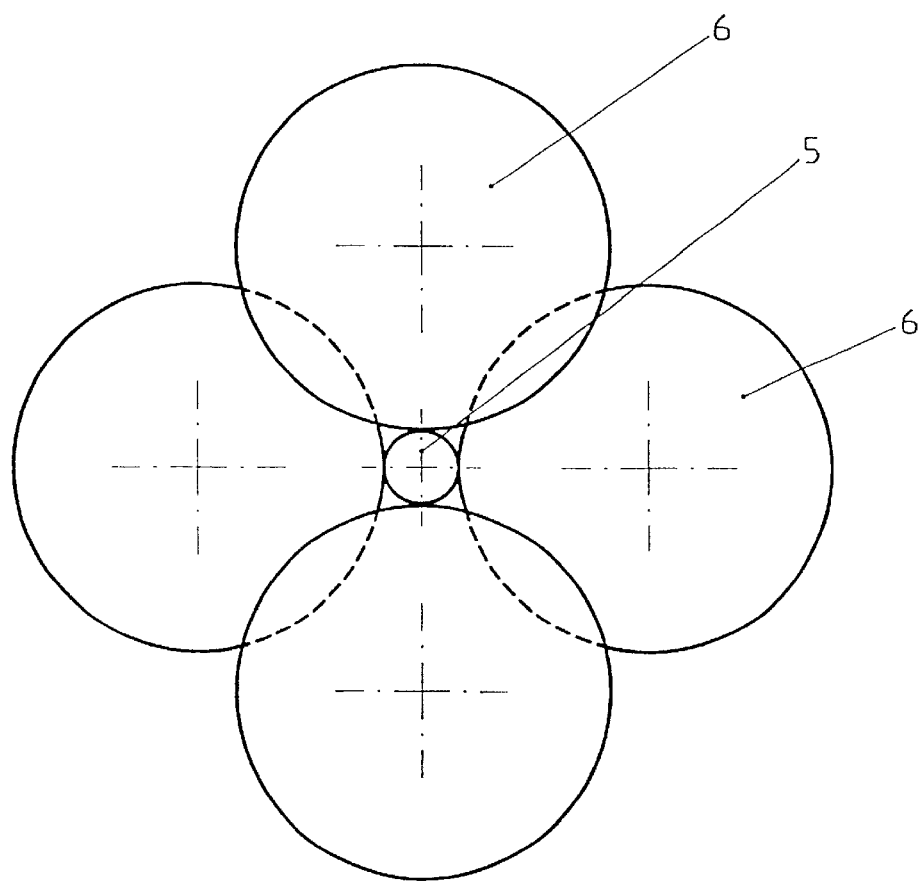
Figure 3:
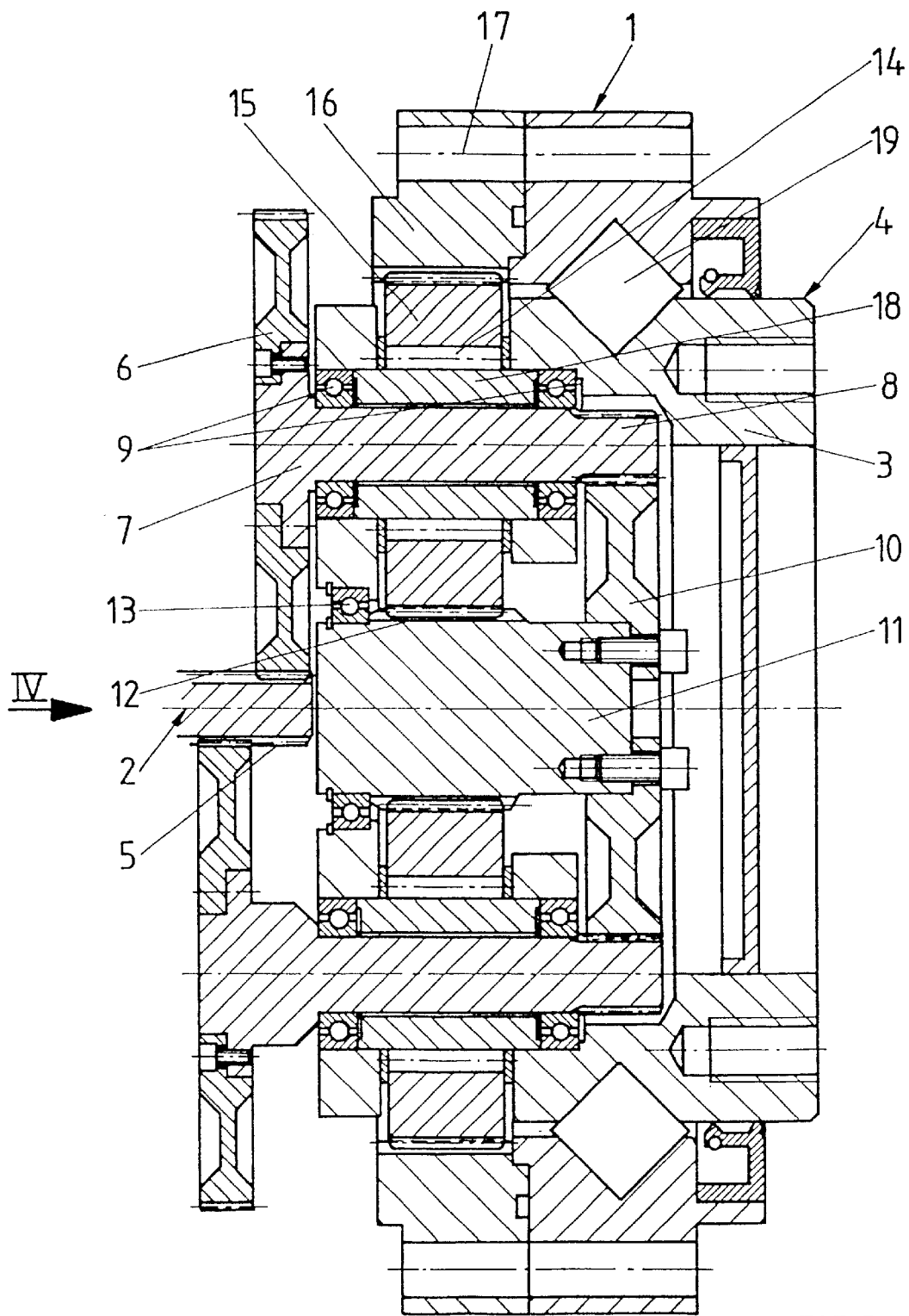
Figure 4:
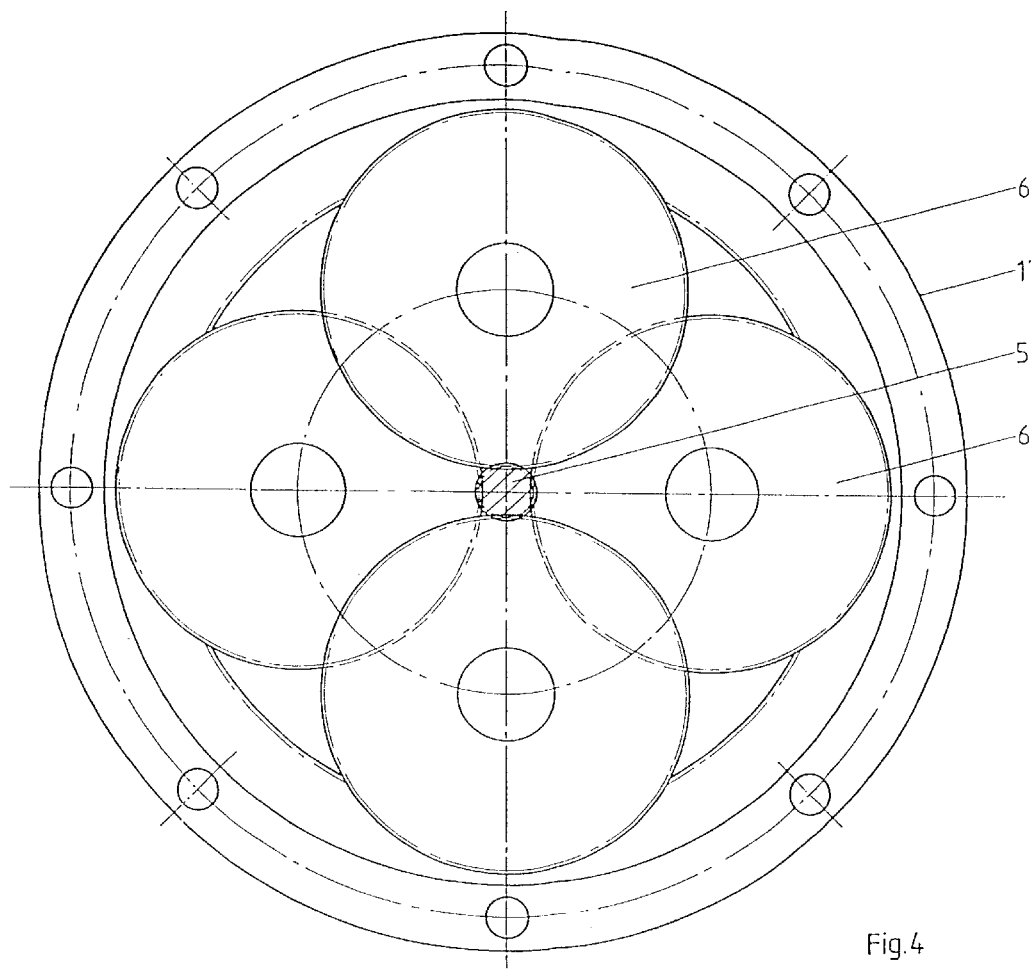

Embodiments of this invention are illustrated in the drawing, showing:

FIG. 1 a schematic diagram of the gearing,

FIG. 2 a view of the gearing in FIG. 1, showing only the intermeshing first and second gearwheels, FIG. 3 a section through a construction design of the gearing according to FIG. 1, FIG. 4 a view of the gearing according to FIG. 3 in the direction of arrow IV.

DESCRIPTION OF FIGS. 1 and 2

An input shaft 2 and an output shaft 3 rotate about a common gear axis A in a stationary gear housing 1. The output shaft 3 is part of a rotating carrier 4 whose function is described in greater detail below.

A first gearwheel 5 which meshes with a second gearwheel 6 is fixedly connected to the drive shaft 2. The second gearwheel 6 is fixedly connected to a third gearwheel 8 by a hub 7 The hub 7 is rotationally mounted in a bearing 9 of the rotating carrier 4 and rotates in this bearing on a planetary axis B.

The third gearwheel 8 meshes with a fourth gearwheel 10 which is in turn fixedly connected to a fifth gearwheel 12 by a hub 11. The hub 11 is mounted in a bearing 13 of the rotating carrier 4.

The fifth gearwheel 12 drives a planetary wheel 15 which rotates on the planetary axis B and is mounted in a bearing 14; of whose counter rotating parts, one is fixedly connected to the planetary wheel 15 and another is fixedly connected to the rotating carrier 4. Said planetary wheel in turn meshes with a hollow wheel 16 that is fixedly attached to the gear housing 1. A bearing supporting ring 18 which is functionally fixedly connected to the rotating carrier 4 serves as the support of the bearing 14 on the inside radially. The fifth gearwheel 12 together with the planetary wheel 15 and the hollow wheel 16 with which it meshes is arranged axially between the gearwheel pairs 5/6 and 8/10. Due to this arrangement of gearwheel pairs, an especially narrow design is achieved.

In the case of a drive of drive shaft 2, the output is via the output shaft 3, which is integrated into rotating carrier 4.

In the case of a design of the gearwheels so that a step-down to slow gear is achieved with intermeshing gearwheels, very high transmission ratios can be achieved with such a gearing. Transmission ratios on the order of i =200 are easily feasible from a technical standpoint. Accordingly, torque can be increased by a factor of up to 200 with such a gearing.

The gearwheels and planetary wheels may have the following diameter relationships:

the first gearwheel (5) is smaller than the second gearwheel (6), the second gearwheel (6) is larger than the third gearwheel (8), the third gearwheel (8) is smaller than the fourth gearwheel (10), the fourth gearwheel (10) is larger than the fifth gearwheel (12), the fifth gearwheel (12) is smaller than the planetary wheel (15).

With the gearing described here, the input shaft 2 and the output shaft 3 may be exchanged functionally, i.e., the drive may be applied to the shaft 3, so that shaft 2 then functions as the output shaft.

In the diagram illustrated here with shaft 2 as the drive shaft, the transmission ratio is stepped down to a slow gear.

With the gearing embodiments described here, multiple second gearwheels 6 may be provided. In the case of multiple second gearwheels 6, an equal number of planetary wheels 15 are provided. A gearing according to this invention expediently has at least four second gearwheels 6 with a corresponding number of planetary wheels 15.

The second gearwheels 6 may mesh axially on different levels with the first gearwheel 5, as illustrated in the schematic diagram in FIG. 2 of four second gearwheels 6 as an example.

The gear housing 1 is divided into two parts and is held together by a connecting flange 17.

DESCRIPTION OF FIGS. 3 and 4

In contrast with the illustration in FIGS. 1 and 2, FIGS. 3 and 4 show the individual parts, labeled with the same reference numbers, in a design suitable for fabrication.

The description of the gearing diagramed schematically in FIGS. 1 and 2 also applies accordingly to the practical embodiment according to FIGS. 3 and 4, which is why the parts having identical reference numbers are not described again here from the beginning.

The following statements are limited to features which either cannot be derived adequately from the drawing or concern a special structural feature going beyond the schematic diagram in FIGS. 1 and 2.

This concerns essentially the following.

The gearing has a total of four second and third gearwheels 6 and 8 as well as an equal number of planetary wheels 15. The bearing 14 is designed as a needle bearing.

The output shaft 3 is an integrated component of the rotating carrier 4. The rotating carrier 4 is mounted in the gear housing 1 by a cross roller bearing 19. The raceway surfaces of this cross-roller bearing 19 are incorporated directly into the counterpart, i.e., rotating carrier 4 and gear housing 1, for reasons of a compact small design of the gearing. Gear housing 1 is divided in the axial direction and the parts are joined together by screws 17. For assembly of the cross-roller bearing 19, a closable inlet opening (not shown) is provided, leading into the interior of the bearing 19 through which the individual rollers of this bearing 19 can easily be inserted along with mutual spacers.

What is claimed is:

1. A multistage toothed gearing having a gear housing (1) and features:

rotating about a common gearing axis (A) are the following:

one input shaft (2) and one output shaft (3), a first gearwheel (5) which is fixedly connected to the input shaft (2), a fourth (10) and fifth (12) gearwheel having a mutual fixed connection, and a rotating carrier (4) mounted in the gear housing (1);

rotating about at least one planetary axis (B) and running parallel to the common gearing axis (A) are the following:

a second (6) and third (8) gearwheel with a mutual fixed connection and one planetary wheel (15) for each set of second and third gearwheels;

the planetary axis (B) rotates about the common gearing axis (A);

the gearwheel connections of said set of second (6) and third (8) gearwheels and the fourth (10) and fifth (12) gearwheels, respectively, are each rotationally mounted in the rotating carrier (4), a hollow wheel (16) is fixedly connected to the gear housing (1);

intermeshing with one another are the following:

the first gearwheel (5) and the second (6) gearwheel, the third gearwheel (8) and the fourth (10) gearwheel, the fifth gearwheel (12) and the planetary wheel (15) and the planetary wheel (15) and the hollow wheel (16);

the planetary wheel (15) and the hollow wheel (16) are arranged in a direction of the common gearing axis (A) between the first (5) and second (6) gearwheels and the third (8) and fourth (10) gearwheels, to which end the connection between the second (6) and third (8) gearwheels passes through the planetary wheel (15) allocated for these gearwheels on its planetary axis (B).

2. The toothed gearing according to claim 1, wherein the planetary wheel (15) rotates on a bearing (14) of whose counter rotating parts, one is fixedly connected to the planetary wheel (15) and another is fixedly connected to the rotating carrier (4).

3. The toothed gearing according to claim 1, wherein the following gearwheels intermesh in separate planes:

the first gearwheel (5) with the second gearwheel (6),
   the third gearwheel (8) with the fourth gearwheel (10),
   the fifth gearwheel (12) with the planetary wheel (15).

4. The toothed gearing according to claim 1, wherein at least two second gearwheels (6) are provided.

5. The toothed gearing according to claim 4, wherein more than two second gearwheels (6) are provided, and of these, at least individual gearwheels which are offset axially relative to one another mesh with the first gearwheel (5).

6. The toothed gearing according to claim 4, wherein the number of second gearwheels (6) matches the number of planetary wheels (15).

7. The toothed gearing according to claim 1, wherein the gearwheels and planetary wheels have the following diameter relationships:

the first gearwheel (5) is smaller than the second gearwheel (6),
   the second gearwheel (6) is larger than the third gearwheel (8),
   the third gearwheel (8) is smaller than the fourth gearwheel (10),
   the fourth gearwheel (10) is larger than the fifth gearwheel (12),
   the fifth gearwheel (12) is smaller than the planetary wheel (15).

8. The toothed gearing according to claim 1, wherein the rotating carrier (4) is mounted in the gear housing (1) over a cross-roller bearing (19), whereby raceway surfaces of cross-rollers of said bearing (19) are incorporated directly into the material of the rotating carrier (4) and its gear housing (1).

9. The toothed gearing of claim 1, wherein the input shaft (2) and the output shaft (3) are interchangeable.

10. The toothed gearing, according to claim 1, wherein more than one third gearwheel (8) are provided.

* * * * *